US006981156B1

(12) United States Patent
Stern et al.

(10) Patent No.: US 6,981,156 B1
(45) Date of Patent: Dec. 27, 2005

(54) METHOD, SERVER SYSTEM AND DEVICE FOR MAKING SAFE A COMMUNICATION NETWORK

(75) Inventors: Michael Stern, Paris (FR); Nicolas Stehle, Paris (FR); Jean-Luc Stehle, Paris (FR)

(73) Assignee: Everbee Network, Paris (FR)

( * ) Notice: Subject to any disclaimer, the term of this patent is extended or adjusted under 35 U.S.C. 154(b) by 0 days.

(21) Appl. No.: 09/720,542

(22) PCT Filed: May 3, 2000

(86) PCT No.: PCT/FR00/01184

§ 371 (c)(1),
(2), (4) Date: Dec. 22, 2000

(87) PCT Pub. No.: WO00/67445

PCT Pub. Date: Nov. 9, 2000

(30) Foreign Application Priority Data

May 3, 1999 (FR) .................................. 99 05609

(51) Int. Cl.⁷ ........................... H04L 9/32; H04L 12/22
(52) U.S. Cl. ....................... 713/201; 713/153; 713/162
(58) Field of Search .............................. 713/151, 152, 713/153, 162, 201

(56) References Cited

U.S. PATENT DOCUMENTS

| 5,349,643 | A |   | 9/1994 | Cox et al. |
| 5,473,692 | A |   | 12/1995 | Davis |
| 5,586,260 | A | * | 12/1996 | Hu .............................. 713/201 |
| 5,828,833 | A |   | 10/1998 | Belville et al. |
| 5,892,178 | A |   | 4/1999 | Reyes |
| 6,658,565 | B1 | * | 12/2003 | Gupta et al. ................. 713/153 |

FOREIGN PATENT DOCUMENTS

WO             07255          2/1998

* cited by examiner

*Primary Examiner*—Justin T. Darrow
(74) *Attorney, Agent, or Firm*—Fulbright & Jaworski L.L.P.

(57) ABSTRACT

The invention concerns a server for management of authentication (S) and devices interconnected between each computer equipment needing to be made secure and the communication network. It enables to make secure said network in a distributed and dynamic manner. The device intercepts communications between a computer equipment (A) whereto it is connected and the network and enables to obtain, by means of an authenticating module, data concerning a user (U) and to define a security level for said device. The authentication management server (S), connected to the network, processes said data and said security level and authenticates the user (U). The server (S) manages the authentication and transmits to the network devices security parameters. Said parameters are stored and processed by the network devices.

29 Claims, 7 Drawing Sheets

METHOD, SERVER SYSTEM AND DEVICE FOR MAKING SAFE A COMMUNICATION NETWORK

BACKGROUND OF THE INVENTION

As an increasing number of companies are connecting to networks and in particular to Internet, security on computer networks becomes an important issue at the dawn of the twenty-first century. Many problems arise in companies and other organizations. These problems are usually referred to under the term of computer hacking; the people who are responsible for this are referred to as hackers.

This computer hacking has several facets. For example, it may be performed from outside or from the inside of 'the company', this term 'company' referring to a firm of an industrial or commercial nature, a government organization or any other association of interests. Further it may have different goals: alter, suppress, peruse data (read, change or delete); or prevent the computer network from operating properly (notably by remotely impairing the operation of the essential computers).

Before continuing, hacking methods shall have to be discussed, those that may be described as physical methods because they are based on physical characteristics of the computer systems.

The first and the most simple of these physical methods is what is called in computers, 'sniffing'. This corresponds to physical spying of connection cables. The hacker may thereby capture all the information which transits within this network. The hacker may obtain vital information: confidential information of any nature, network user passwords. He may also alter or delete these data.

A second method of physical hacking requires very considerable means. It is based on intercepting electromagnetic waves emitted by a computer screen (or emitted by any component of the computer system). Another physical hacking method consists in perusing typed texts by simple observation while it is being typed on the keyboard or during its display on the screen. (Direct or indirect observation of the user).

These physical methods are undetectable for the computer system and are independent of this system.

Except for these physical methods, computer hacking may also be based on methods which will be termed as logical methods. These methods directly tackle the computer system's logic.

Generally they make use of the weak points of this logic. Most of these methods frequently use what is called a trap, i.e. a loophole in an operating system or in another software package. These traps are entry points in a computer system which pass over the normal security measures. This may be a concealed program inside the computer system or an electronic component which makes the protection system inefficient. Further, the trap is often enabled by an event or a "normal" action. The trap may also be a voluntary loophole in the security system. In this case, the traps are not always harmful: certain operating systems have user accounts with high privileges for facilitating the work of maintenance technicians.

In order to understand these logical methods, it should be brought to mind that every time a user makes a request in order to access a file or more generally a computer resource, the operating system decides whether this user is authorized or not to access this file. The operating system makes this decision according to several criteria such as the owner of the file, the identification of the person who is requesting access to it, the access authorizations which have been determined by the owner. Therefore, the hacker must deceive the computer system in order to obtain the desired information by interfering with its logic.

It is practically unfeasible to create an exhaustive list of the methods used for hacking computer data or a network as these methods are so numerous. However, it should be stressed that they include common points after all and more particularly a common logic. General methods may thereby be established for opposing these hackers.

A first known method for defeating logical hacking consists in asking the user to provide a password in order to access data, a password which is acknowledged by the operating system. This password is a numerical value. Today, this remains the keystone of all security systems. Now, this is also its primary weak point: a hacker which knows the password of a user may access to this user's private data and may also impersonate this user which is far worst. Any action, error, mistake thereby committed by the hacker will therefore be wrongly ascribed to the hacked user.

Another known method for defeating hacking consists in encrypting data. This method is often considered as sufficient. This enciphering is presently carried out with software packages or electronic cards. The enciphering is based on using an encipherment key. This encipherment key is one of the weak points of this method. With this method, when two computers want to communicate which each other, they must first be authenticated one by the other, i.e., use a common encipherment key. Presently this authentication process is numerical and is based either on a code typed in by the user or on a code logically generated by both computers. In this second case, unfortunately, both computers have to exchange a sequence of information until they mutually authenticate each other. It follows that a third computer entering and hacking this system may locate the generated code by perusing over this exchange of information. By doing this, it may have access to the transmitted data and may even usurp the identity of these hacked machines.

Data encryption is also used for making information contained on a computer data medium incomprehensible. In this case, the enciphering keys are generated in the same way as for encipherment of transmissions.

All enciphering methods presently used are based on mathematical algorithms. There are two encipherment algorithm classes: symmetrical algorithms and asymmetrical algorithms.

The symmetrical algorithm only uses one single enciphering key which therefore serves both for encrypting and decrypting data at the same time. Conversely, the asymmetrical algorithm uses two keys: a public key and a private key. In this second enciphering method, each user has two keys: a private key and a public key. His public key is known to all the other users. With it, the message may be encrypted but not decrypted. His private key is only known to him exclusively, and is unknown to the other users. With it, the enciphered message may be decrypted.

An asymmetrical system may be used for a key exchange protocol, i.e., a protocol enabling two users to agree on a symmetrical encipherment key to be used for the actual encipherment.

An example of such a protocol is detailed in U.S. Pat. No. 4,200,770 et CA-1121480. As an example, and for a better understanding of the present document, this asymmetrical algorithm is described hereafter.

In the rest of the present document, the notation g^a[N] represents g to the power of a, modulo N.

Let A et B be two users of the algorithm. Each user has a confidential private key, for example 'a' for A et 'b' for B. The numbers g^a [N] and g^b[N] are known to all. Numbers g et N are fixed and chosen once and for all by A and B, in such a way that the multiplicative group for the successive powers of g modulo N has a large number of elements. Practically, N is chosen to be a very large prime number with for example about a hundred of decimal figures and such that (N−1)/2 is prime, and that g is a primitive root modulo N, i.e. a generator for the multiplicative modulo N group.

When A wants to communicates with B in such a way as to be only understood by B, A takes the public key of B: g^b and raises it to the power of 'a' (always modulo N) which gives g^(ba) and thus provides the encipherment key for a symmetric algorithm. B is the only one able to understand the message by doing (g^a)^b=g^(ab)=g^(ba) [N].

This method works because there is no known algorithm for solving within a reasonable time, the 'x' equation: g^x=d [N] if N is very large.

Private keys 'a' and 'b' of A and B are usually generated by random number generators upon first communication between the two speakers. As these numbers are not always stored, they must now be regenerated regularly.

The encipherment algorithms presently used are very efficient. However, user authentication is not fully satisfying. In the case of direct authentication between two encipherment devices (therefore without any human intervention), a third encipherment device may manage to impersonate one of the other two devices and may thus access data on the other computer, as already mentioned. If the authentication requires that a code be typed in by the user on the keyboard of his computer, this code may be intercepted by a hacker or may be directly observed when it is typed in on the keyboard.

There is a third known method against hacking. This method is related to the protection of internal networks. In order to prevent intruders from penetrating into an internal network, several companies have introduced on the market, locks (more commonly called "firewalls" by computer specialists). This is a logical barrier between the company's network and a network which has not been made secure (for example, Internet). A lock is a device placed on a specific computer which prevents unauthorized accesses to information resources of the internal network. In other words, a lock operates like a gateway by monitoring information flowing in both directions. It is able to prevent certain external users from accessing certain data or software resources of the internal network. Thus, security problems of the internal network with regards to the outside world, are normally confined in one single point of the network: the lock.

This lock, if it is properly used (alas, this is the case very rarely), is logically impenetrable. So, one will have to resort to another approach: for instance, the hacker will prevent the computer hosting the lock from properly operating by saturating it with messages sent to it profusely which will force this computer to exceed its information processing capabilities. If this computer is no longer running, the hacker may then penetrate into the network which is no longer made secure by the lock.

Further, a lock is no protection against a possible hacker directly working within the network. Unfortunately, this case is not an exception and according to the FBI, more than 80% of the hackings would be due to a person having an internal access to the network.

In order to defeat computer hacking in addition to the aforementioned prevention techniques, an attempt may also be made to find out who the author of this hacking is. It is possible to make use of the computer traces left behind him: opening of files, connections with servers . . . indeed, most computer handling operations leave digital traces in the operating systems. Unfortunately, it is rather easy to conceal these traces: usurping somebody's identity by using his password, borrowing a workstation so as to have someone else accused, are standard hacker techniques and are very easily implemented. Indeed today, user authentication is performed through his digital identifier but not by recognizing the physical person. As a result, one can never be absolutely certain of the identity of the user of a computer.

In order to increase the level of user authentication, several companies use bank authentication techniques: chip cards. New physical authentication methods like examining the retina or the finger prints of the user, exist but are still not very used because their reliability is still relatively unknown.

To summarize, it may be stated that the present methods for making a computer network safe have definite drawbacks. Indeed, they are based on operating systems having security loopholes, on imperfect authentication of the users. Furthermore, although security problems from outside the companies or the computerized organizations are feared essentially, it should also be considered, unfortunately, that very often these problems have an internal cause. A satisfactory method for making a computer network secure must therefore protect this network both from external and internal hacking.

SUMMARY AND OBJECTS OF THE PRESENT INVENTION

The object of the present invention is to solve the aforementioned primary security problems of internal networks of a company or of any other interest group.

For this purpose, the present invention provides a method for distributively and dynamically making a communications network secure, notably of the Internet type, characterized in that it comprises the following steps:
- the step for interconnecting a device between each piece of computer equipment which should be made secure and the communications network,
- the step for intercepting communications between a piece of computer equipment provided with the device and the communications network by means of said device to which this equipment is connected,
- the step for obtaining information related to a user of the piece of computer equipment by means of an authentication module associated with said device,
- the step for defining a security level of the aforementioned device by means of the authentication module associated with the device,
- the step for transmitting information related to the user and the security level of the device to an authentication management sever connected to the network,
- the step for processing by means of the server, said information related to the user and the said security level of the device and for authenticating the user with the help of such information,
- the step for managing authentications and security levels by means of the authentication management server,
- the step for transmitting security parameters from the server to the network devices,
- the step for storing by means of the devices, said security parameters from the server,
- the step for processing by means of the devices, said security parameters from the server.

This enables the identity of the user of the device according to the invention to be known at any time. Thus, the user authentication is performed in two steps: the authentication module sends information on the user (for example the fact that he has been properly authenticated by means of such a chip card, or still by his finger prints or a picture of his retina). This information is specific to each user and is sent to the authentication management server. This server then checks whether the relevant user is authorized to use the network component equipped with the device according to the invention which has just sent the authentication request. The server then sends back to the device according to the invention, its consent or it reports that the user is not authorized to use said network component.

This method provides distributed and dynamic security on a computer network. Indeed, security is supported by interconnected devices between each computer equipment which should be made secure and the communications network. The security of these devices is managed by a central server which receives information from all these devices. The server may now choose an overall security policy which will then be applied at each of the devices.

This security is configurable and it may develop over time according to new needs or modes of attack.

Indeed, a more flexible management of the network is achieved by having this list of security parameters sent by an authentication management server. The sent information may be very simply changed on the authentication server. User access authorization may thereby be changed easily.

Specifically, it should be noted that the security parameters depend on:
 the user,
 the network component which he desires to use,
 the security level which he has selected,
 the date and time,
 the network status
 and all the security parameters already provided to the devices.

On the other hand, an embodiment using a data medium specific to each user and containing the aforementioned list does not provide simple management of the network: any change in the security parameters of the user requires the changing of data contained in his private data medium.

The address of the authentication management server is either provided by the user of the device or already stored in the device.

Advantageously, the security parameters comprise:
 a list of authorized computer client/server applications,
 information enabling the devices to analyze the messages related to said client/server applications.

Advantageously, the method according to the invention consists of:
 the step for analyzing by means of the device, the messages related to said client/server applications,
 the step for filtering by means of the device, the messages related to said client/server applications,
 the step for changing by means of the device, the messages related to said client/server applications.

The filtering of the messages may thus eliminate information packets which do not comply with the communications protocol used on the computer network. Indeed, an information packet of a specific communications protocol (for example TCP/IP, FTP, POP, etc.) has certain properties which are easy to check. If the packet does not have them, it is considered as invalid. This operation is usually performed by the operating system or by a lock. The device according to the invention may therefore alleviate the task of the network component to which it is connected.

One should be aware that the computer hacker often uses badly formed packets sent in a great number onto the machine to be hacked in order to increase the operational load of this machine with the purpose of interfering with its operation.

The security parameters enabling the messages related to said client/server applications to be analyzed may also contain a list of communication ports. One should be aware that each software package which needs to communicate with the network, uses a certain communication port. For example, in order to read electronic mail, a well-defined port must be used, another one has to be used for examining Internet sites.

Thus, an application may already be well characterized by a simple list of communication ports. Hackers often use a Trojan horse, i.e. a program placed on the target machine which will enable the hacker to perform certain tasks thereon. Now, a Trojan horse needs a communications port in order to receive orders from its designer. When a packet passes through the device, the device's processing means check whether this packet is using an authorized port. Thus, a given user may be prevented from accessing to the Internet or a Trojan horse may be prevented from chatting with its designer.

This method provides a lock managed by a server and distributed over all the network. In addition, this lock has particular properties for each piece of computer equipment equipped with the device.

Advantageously, the security parameters further comprise:
 a list of pieces of computer equipment which the user is authorized to communicate with.

Advantageously, the method according to the invention further consists of the following steps:
 the step for having the device transmit messages between the piece of computer equipment to which it is connected and the computer equipment which the user is authorized to communicate with,
 the step for having the device block the messages between the piece of computer equipment to which it is connected and the computer equipment which the user is unauthorized to communicate with.

The filtering of the messages is first carried out according to the list of network components which the user of the invention is authorized to communicate with. Because, it should be recalled that each information packet contains the address of the sender or of the addressee. Thus, a user will be unable to receive or send messages to computer equipment which does not belong to his address list.

With this method, a system may be designed for partitioning the network components.

Advantageously, the method according to the invention further comprises the following steps:
 the step for customizing the device with a private encipherment key provided by means of the authentication module,
 the step for storing, by means of the server, all the public encipherment keys associated with the private encipherment keys which customize the devices.

Advantageously, the security parameters further comprise:
 a list of pieces of computer equipment which the user is authorized to communicate with, in an enciphered way, the public encipherment key of each piece of computer equipment which the user is also authorized to communicate with, in an enciphered way.

Advantageously, the method according to the invention further comprises the following steps:

the step for enciphering by means of the device, communications by combining the private encipherment key of said device with the public encipherment key of the computer equipment which the user is authorized to communicate with, in an enciphered way.

In this operating mode, each device is customized by a private encipherment key allowing an encipherment key exchange protocol to be executed. This private key is associated with a public encipherment key registered in the list of pieces of computer equipment which the user is authorized to communicate with, in an enciphered way.

As a reminder, if the asymmetrical algorithm from U.S. Pat. No. 4,200,770 is used, the private key is written as 'a' and the public key is written as $g^a$ [N].

The present invention provides a system for distributively and dynamically making a communications network secure, notably of the Internet type, characterized in that it comprises:

a device interconnected between each piece of computer equipment which should be made secure and the communications network, said device including two input/output interfaces for intercepting communications between a piece of computer equipment to which it is connected and the communications network, said device further including an authentication module for obtaining information related to a user of the piece of computer equipment to which the device is connected, said module enables a security level of said device to be defined, said device including means for transmitting information related to the user and to the security level of the device, an authentication management server connected to the network, including processing means for processing said information and said security level and for authenticating the user with the help of said information, said server including management means for managing authentications and security levels, said server including means for transmitting security parameters to devices of the network, said devices including storing means for storing said security parameters, said devices including processing means for processing said security parameters.

Advantageously, the security parameters comprise:

a list of authorized computer client/server applications, information enabling the devices to analyze the messages related to said client/server applications.

Advantageously, the processing means of the device comprise:

means for analyzing the messages related to said client/server applications, means for filtering the messages related to said client/server applications, means for changing messages related to said client/server applications.

Advantageously, the security parameters comprise:

a list of pieces of computer equipment which the user is authorized to communicate with.

Advantageously, said processing means of the device comprise:

means for allowing messages to be transmitted between the piece of computer equipment to which the device is connected and the computer equipment which the user is authorized to communicate with, means for blocking messages between the piece of computer equipment to which said device is connected and computer equipment which the user is not authorized to communicate with.

Advantageously, the system according to the invention comprises:

an authentication module associated with the device customized by means of a private encipherment key which customizes the device with which it is associated, a server storing all the public encipherment keys associated with private encipherment keys which customize the devices.

Advantageously, the security parameters comprise:

a list of pieces of computer equipment which the user is authorized to communicate with, in an enciphered way, the public encipherment key of each piece of computer equipment which the user is authorized to communicate with, in an enciphered way.

Advantageously, the devices comprise:

an encipherment module for enciphering communications by combining the private encipherment key of the device with the public encipherment key of the computer equipment which the user is authorized to communicate with, in an enciphered way.

The present invention provides a server for distributively and dynamically making a communications network secure, notably of the Internet type, characterized in that it comprises:

processing means for processing information from a device and related to a user of a piece of computer equipment to which this device is connected, said processing means enable the user to be authenticated with the help of said information, management means for managing the authentications, transmission means for transmitting the security parameters to the devices of the network.

Advantageously, the security parameters comprise:

a list of authorized computer client/server applications, information enabling the devices to analyze the messages related to said client/server applications.

Advantageously, the security parameters comprise:

a list of pieces of computer equipment which the user is authorized to communicate with.

Advantageously, the server according to the invention comprises:

storage means for storing all the public encipherment keys associated with the private encipherment keys which customize the devices. Advantageously, the security parameters comprise:

a list of pieces of computer equipment which the user is authorized to communicate with, in an enciphered way, the public encipherment key of each piece of computer equipment which the user is authorized to communicate with, in an enciphered way.

The present invention provides a device for making a communication network secure, interconnected between each piece of computer equipment which is to be made secure and said network and characterized in that it comprises:

two input/output interfaces for intercepting communications between a piece of computer equipment to which it is connected and its communications network, an authentication module for obtaining information related to a user of the piece of computer equipment to which said device is connected and for defining the security level of said device, means for transmitting information related to the user and the security level of the device, to an authentication management server, storage means for storing security parameters from the server, processing means for processing said security parameters from the server.

Advantageously, the security parameters comprise:

a list of authorized computer client/server applications, information enabling the devices to analyze the messages related to said client/server applications.

Advantageously, said processing means of the device comprise:

means for analyzing the messages related to said client/server applications, means for filtering the messages related to said client/server applications, means for changing the messages to said client/server applications.

Advantageously, the security parameters comprise:

a list of pieces of computer equipment which the user is authorized to communicate with.

Advantageously, said processing means of the device comprise:

means for allowing messages to be transmitted between the piece of computer equipment to which the device is connected and computer equipment which the user is authorized to communicate with, means for blocking messages between the piece of computer equipment to which the device is connected and computer equipment which the user is unauthorized to communicate with.

Advantageously, the authentication module associated with said device provides:

a private encipherment key which customizes said device.

Advantageously, the security parameters further comprise:

a list of pieces of computer equipment which the user is authorized to communicate with, in an enciphered way, the public encipherment key of each piece of computer equipment which the user is authorized to communicate with, in an enciphered way.

Advantageously, the device according to the invention comprises:

an encipherment module for enciphering communications by combining the private encipherment key of said device with the public encipherment key of the piece of computer equipment which the user is authorized to communicate with, in an enciphered way.

Thus, a computer equipment may communicate with another computer equipment in an enciphered way. The packet to be sent is enciphered by an encipherment module with the help of the encipherment key corresponding to the address of the other piece of computer equipment. The packet received from the network is deciphered by the private encipherment key of the device.

BRIEF DESCRIPTION OF THE DRAWINGS

For a better understanding of the invention, several embodiments thereof will now be described, as purely illustrative and non-limiting examples. In the drawing.

DETAILED DESCRIPTION OF THE EMBODIMENTS

Figure 1:
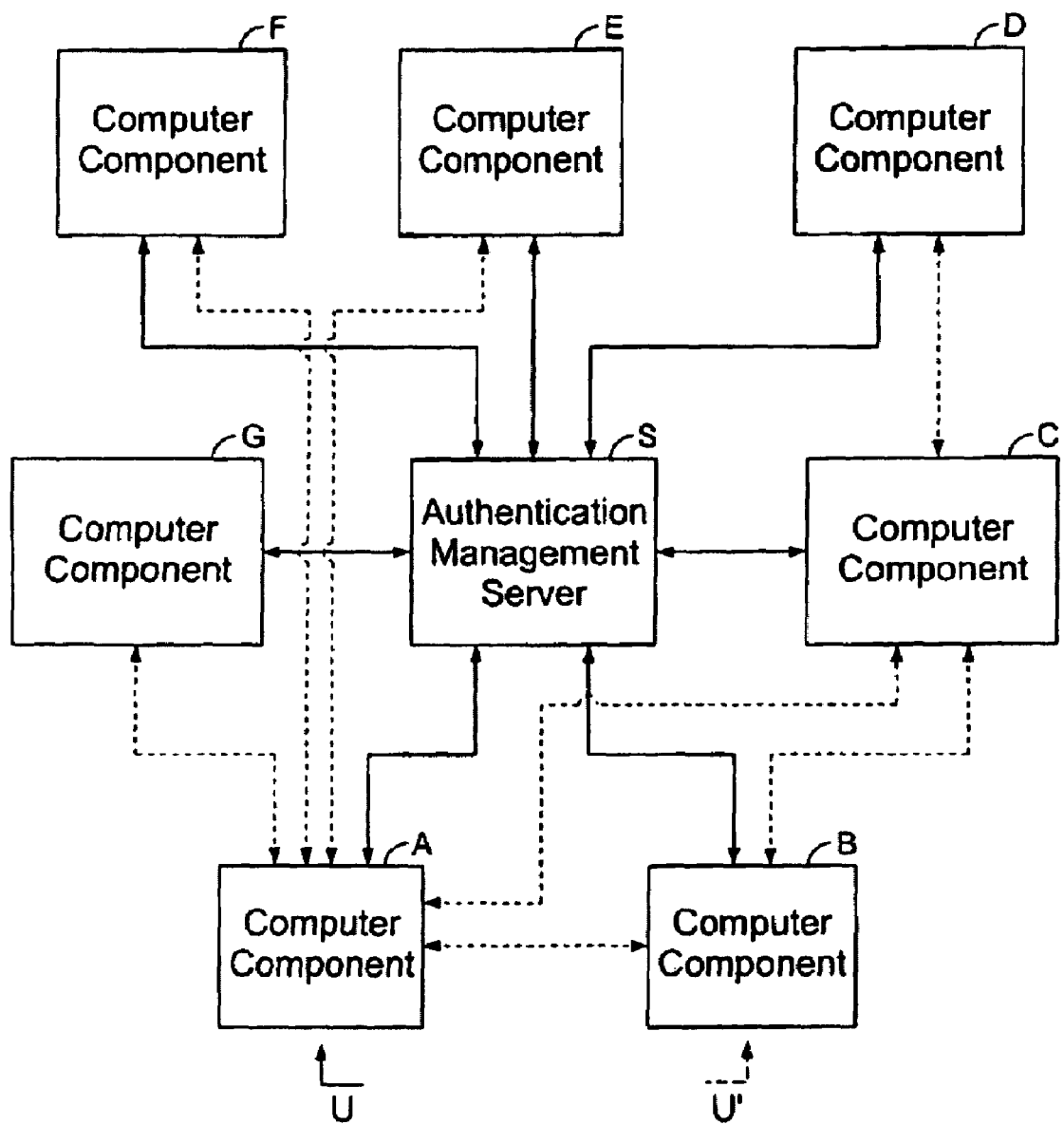
FIG. 1 shows a general diagram of a computer network made secure through the invention.

FIG. 1 shows a general diagram of a network made secure through the invention. This may be an internal network of a company, a public network like Internet or a mixed network, i.e. one or more internal or external networks connected with each other. This network is made up of 7 computer components noted as A, B, C, D, E, F, G which may be a computer, a computer server, a portable computer, a printer server, a printer . . . These computer components are equipped with the device according to the invention. The network has an authentication management server S. Two users of this network have be illustrated: a user U using component A of the network and a user U' who may use component B of the network.

Figure 2:
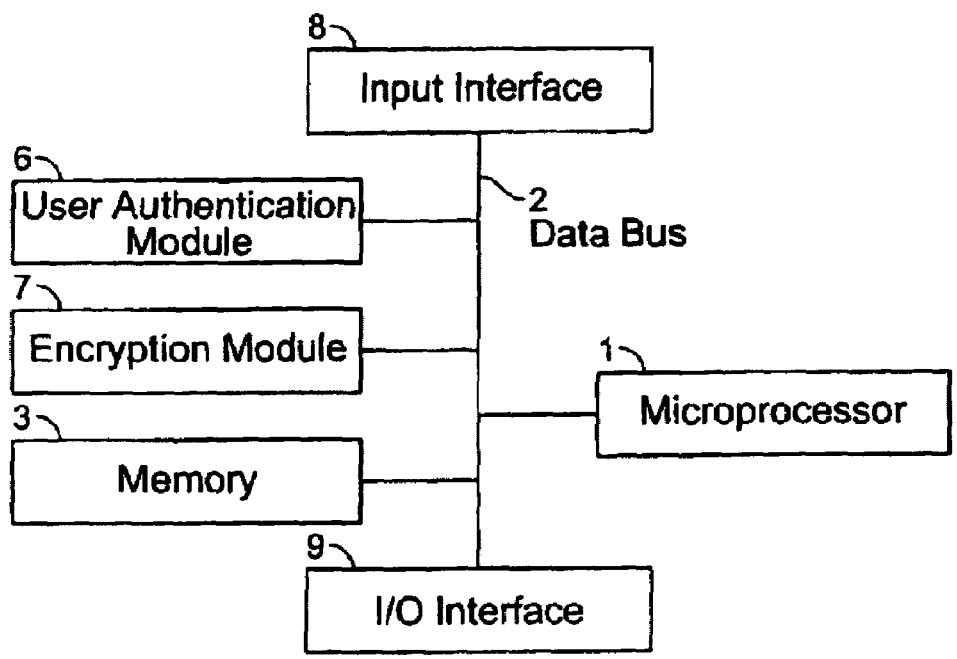
FIG. 2 shows a general diagram of a first embodiment of the device according to the invention.

FIG. 2 shows a general diagram of a first embodiment of the device according to the invention, made up of a microprocessor 1, connected through a data bus 2 to a memory 3, to two input/output interfaces 8 and 9, to a user authentication module 6 and to an encryption module 7.

Figure 3:
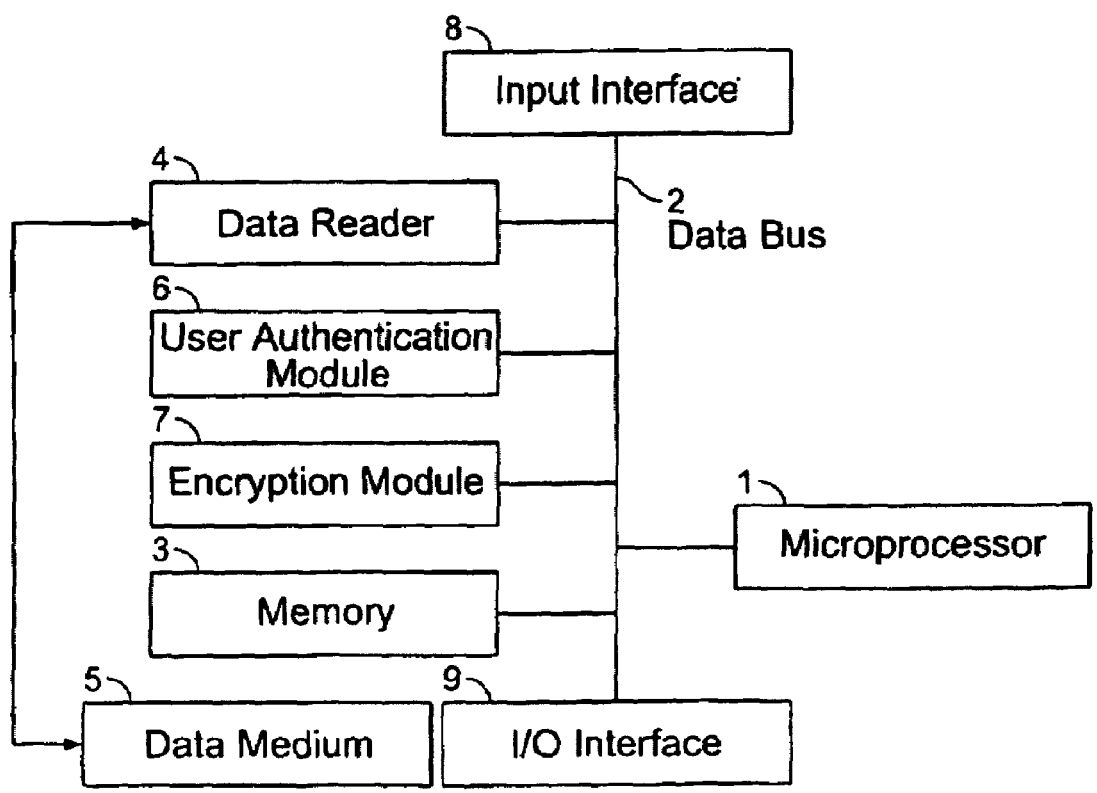
FIG. 3 shows a general diagram of a second embodiment of the device according to the invention.

FIG. 3 shows a general diagram of a second embodiment of the device according to the invention, wherein a data reader 4 connected to a data bus 2 and a data medium 5 specific to each user have been added.

Figure 4:
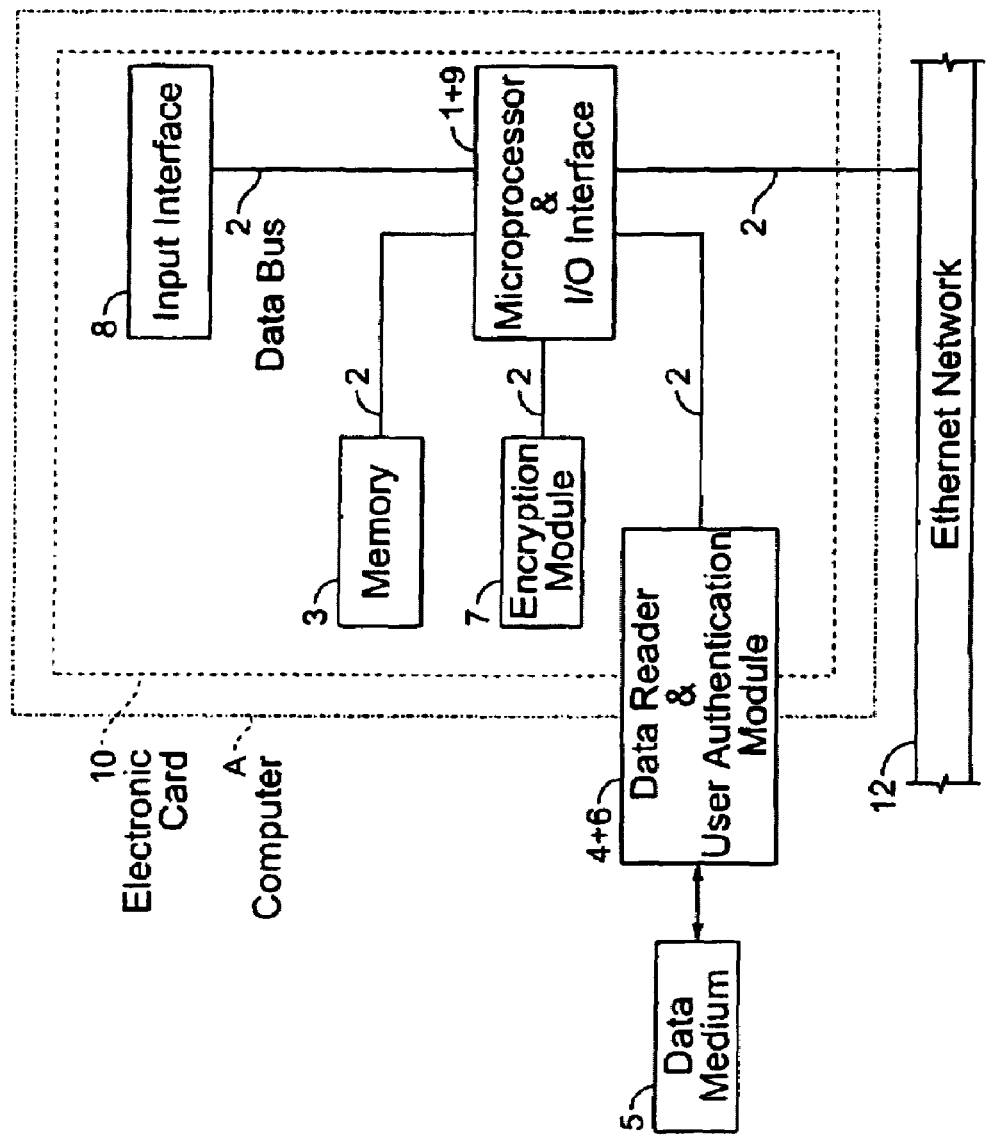
FIG. 4 shows the second embodiment of the device according to the invention when it is implemented in a computer.

FIG. 4 shows the case when the device according to the invention is placed in a computer A connected to an Ethernet network 12, using the communications protocol: 'Transport verification protocol' commonly called 'Transport Control Protocol' or TCP within the 'Internet protocol' framework, commonly called the Internet protocol or IP which will be referred in what follows as the TCP/IP communications protocol. The device according to the invention is then made up of an electronic card 10 which is placed in computer A and which bears the microprocessor 1, the encryption module 7, both input/output interfaces 8 and 9 (the latter optionally included in 1) and memory 3. The microprocessor 1 is connected through a series connection to a chip card reader with a keyboard. This reader comprises both the data reader 4 and the authentication module 6 which will be noted as 4+6.

Each user has a chip card as data medium 5 containing his identification number, the user private key 'u' for encrypting communications with the authentication management server S described in FIG. 1 as well as the IP (Internet Protocol) address and the public key of said server S. Each chip card also contains one or more personal encryption keys and a list of authorized communications ports. The encryption module 7 is based on a block algorithm. The input/output interface 8 is an interface providing connection to a PCI bus, the other interface 9 providing connection to the Ethernet network 12.

In this example, each electronic card 10 is customized by the private encryption key contained in memory 3, thus, with the help of an asymmetrical encryption algorithm, communication between the network components equipped with the device according to the invention are encrypted in a unique way for each pair of network components having the device according to the invention. In this example, an asymmetrical key exchange algorithm will be used as described in the aforementioned US and Canadian patents. A microprocessor directly managing the PCI bus (therefore including the input/output interface 8) and the Ethernet interface (therefore including the input/output interface 9) may be used as microprocessor 1. Several of them are produced by Motorola today (for example ref.: MPC860T). This microprocessor is directly connected to the encryption module 7 which is a DES chip (Data Encoding Standard described in the American Standard NBS FIBS PUB 46 as of Jan. 15, 1977) produced by Newbridge under ref. CA95C68.

For instance, the chip card reader is a reader manufactured by Gemplus under ref. GCR 500-MS.

Now the device's operation will be simulated.

A user U inserts his personal chip card into the reader of computer A. He types in, on the keyboard of the chip card reader, his confidential code which makes the data contained in the chip card of user U legible for said reader. The chip card contains the user's identification number, the private key 'u' of the user for encrypting communication with the authentication management server S as well as the IP address and the public key of the authentication management server S. The electronic card of computer A sends the identification number of user U, in an encrypted way, to the authentication management server S, by using the encryption key (g^s [N]) which it solely possesses with the authentication management server S ('s' indicates the private encryption key of the server). Indeed, the authentication management server S has access to all public keys, therefore it is aware of g^a [N], and may therefore calculate g^as [N]. On its side, A is aware of its private key 'a' and of the public key g^s [N] of server S and may therefore calculate g^as [N] on its side. The message may now be encrypted by A and decrypted by server S. Server S then consults its table in order to determine the list of TCP/IP addresses which the user U may communicate with, and for each address, the public encryption key associated with this address. Furthermore, it identifies the IP address of computer A with user U.

The authentication management server then sends to the device according to the invention which equips computer A, the list of authorized addresses for user U as well as their public keys and the list of authorized communications ports for this user. This sending always occurs in an encrypted way but this time, by using key g^su [N] (where 'u' represents the user's private key for encrypting communications with the authentication management server S). The microprocessor 1 of the electronic card 10 placed in computer A then stores this list.

In order not to impair the network's operation, the microprocessor 1 calculates the encryption keys g^ab [N] (where 'b' is the private key of any other network component B) when it has nothing else to do. The calculated keys are then stored by microprocessor 1. These keys will be deleted as soon as the user removes his chip card 5 from reader 4.

When an information packet arrives (from the network or from the central processing unit (CPU) of the computer), processor 1 must unwrap the TCP/IP protocol in order to find: the communications port used by the packet, the address of the addressee (if the packet comes from the CPU) or of the sender (if the packet comes from the network). This address will be called 'packet address' in the rest of the document. This unwrapping of the packet allows certain invalid packets to be detected which no longer observe all the criteria of the TCP/IP communications protocol. Details on the TCP/IP unwrapping are explained in the book by Mr. Guy Pujolle 'Les reseaux' on pages 539–579.

When computer A communicates with another component of the network, for example computer B, the microprocessor 1 checks whether the port used by the packet belongs to the list of authorized ports. Then the microprocessor 1 examines the packet's address: if it belongs to the authorized addresses, the packet is processed, otherwise the packet is ignored. In the first case, the microprocessor searches whether the encryption key (g^ab [N]) required for communications between A and B, has already been calculated. If this is not the case, the microprocessor calculates the missing key. Once the encryption key (g^ab [N]) is known, the packet is encrypted if it comes from the CPU or decoded if it comes from the network, then the processor regenerates the TCP/IP wrapping. Thus, the communications are well-customized between two pairs of network components equipped with the device according to the invention.

Under the assumption that the address of computer B is in the list of network components which user U of computer A is authorized to communicate with, the microprocessor 1 of the electronic card 10 placed in computer A may calculate the encryption key (g^ab [N]) which will be used by the DES chip for communicating in an encrypted way with the other computer B. A distinction must now be made between several working cases of computer B:

a) There is a user U' on computer B. This user U' also has certain public keys including the one of A. Communications then take place without any problems.

b) There is a user U' on computer B. However, this user U' does not have access to computer A. User U of computer A therefore cannot communicate with computer B as he would risk affecting the system's security.

c) There is no user on computer B. The device according to the invention connected to computer B asks the authentication management server S whether user U is authorized to have access to computer B as nobody is keeping a watch on him. If the device according to the invention associated with computer B obtains this permission, the public key of the device according to the invention connected to computer A, will be sent back to it by the authentication management server S, exclusively.

d) No user was using computer B but user U had obtained permission from the authentication management server to communicate with B. The arrival of a user U' on computer B leads to alternatives a) or b).

e) Computer B was being used by user U' who then stops using the invention by removing his chip card. This change results in alternative c).

Now, under the assumption that the user of computer A desires to personally encrypt data on his computer, he sends the data to be encrypted to the microprocessor 1 with the help of a software package which is not part of the invention. These data are then encrypted with the help of the DES chip of the encryption module 7 and of one of the personal encryption keys contained in the chip card of the user (the encryption key is selected by the software package). Decrypting works in the same way.

If the device according to the invention is not customized by a private encryption key, this key being then stored on each data medium 5, the microprocessor 1 must read this key from the data medium 5 before calculating the encryption keys.

If communications between each pair of network components equipped with the device according to the invention are not customized, the microprocessor 1 does not have to calculate the encryption keys required for encrypting communications because they are then contained on each data medium 5, in the list of private encryption keys.

It should be noted that a user may have several chip cards, including one which does not have any list of network components but contains personal encryption keys exclusively. Thus, the user may encrypt or decrypt data and work on these data without being connected to the network.

By having several chip cards, the user may therefore have access to different security levels on different computer groups. The security parameters transmitted by the server of course depend on the required security level.

Figure 5:
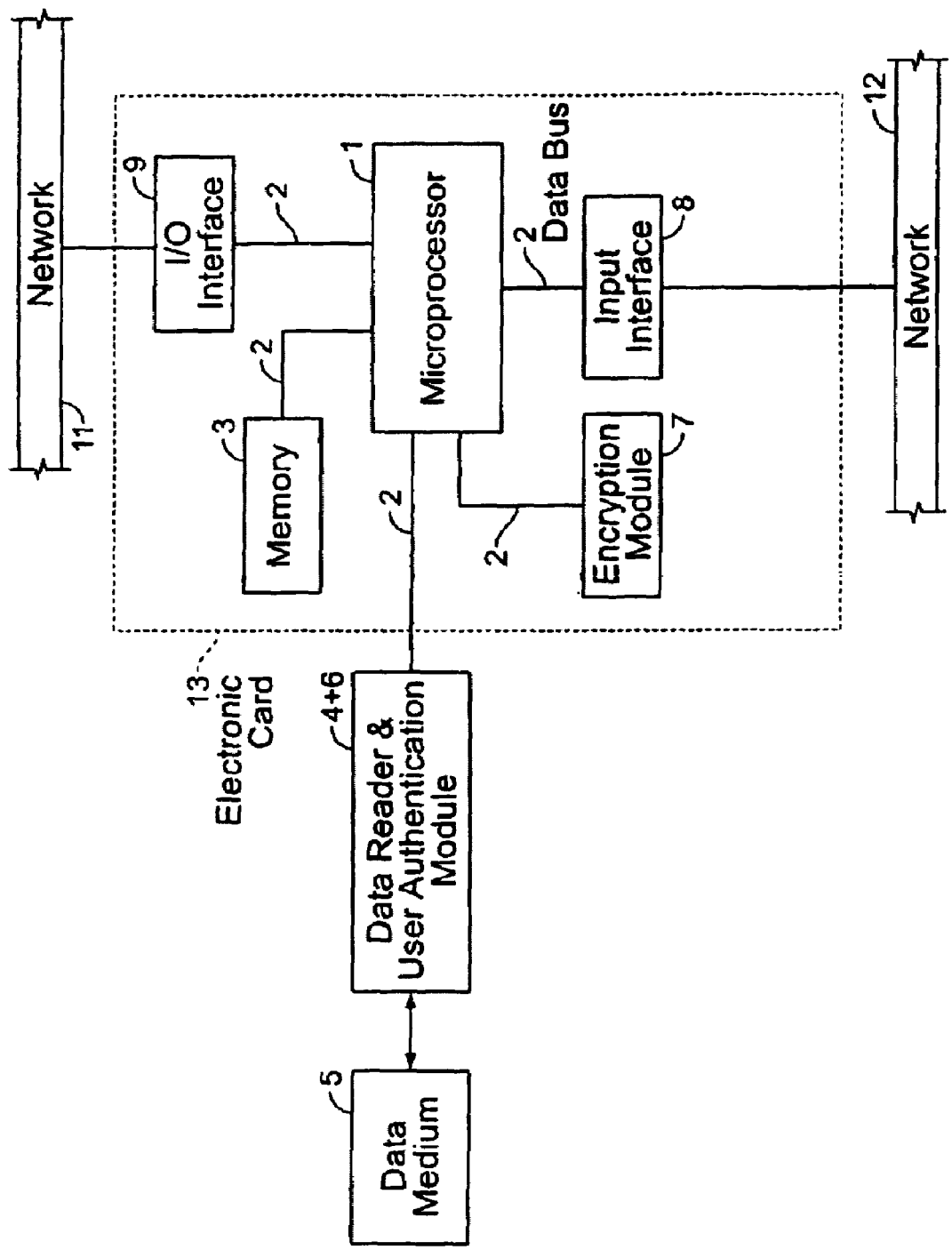
FIG. 5 shows the second embodiment of the device according to the invention when it is on the outside of a computer component as an external module.

In another embodiment of the invention illustrated in FIG. 5, where each device according to the invention is not placed in a computer, but placed as an independent module on the network, it may be contemplated that the device according to the invention is then not customized by a private encryption key contained in memory 3 but by a private encryption key contained on the data medium 5 specific to each user; this key is read as soon as the user is authenticated by the authentication module. In this embodiment illustrated in FIG. 5, the device according to the invention is made up of en electronic card 13 bearing the microprocessor 1 connected through several buses 2 to: a memory 3, an encryption module 7, both input/output interfaces 8 and 9 which, in this embodiment, are network interfaces providing for example the Ethernet wrapping in the case of an Ethernet network. The data reader 4 may further be coupled with an authentication module 6 as a chip card reader which may be placed on the electronic card 13 or which may be external to the above described module according to another embodiment.

The components used in this embodiment may be those used in the first embodiment.

Operation of the module is identical to the operation of the device according to the invention as described in the first embodiment except as regards the private encryption key. This key must be read as soon as the user is identified with the help of the identification module 6 so that the encryption keys (($g^{ab}$ [N]) may be calculated.

It should be noted that the chip card reader may be replaced with a finger print reader or with the reader for the retina of the user. The address of the authentication management server S is then contained in memory 3 as well as its public encryption key. When the user is authenticated with the help of the authentication module 6, this module 6 then has the digital information on the user, which it sends to the microprocessor 1. The latter then uses part of this information (for example the first 128 bits) in order to form the private key 'u' of the user for encrypting communications with the authentication management server S.

Everything then takes place as in the case of the chip card reader except for the fact that the user must report when he ceases using the device according to the invention, for example by pressing on a button.

Figure 6:
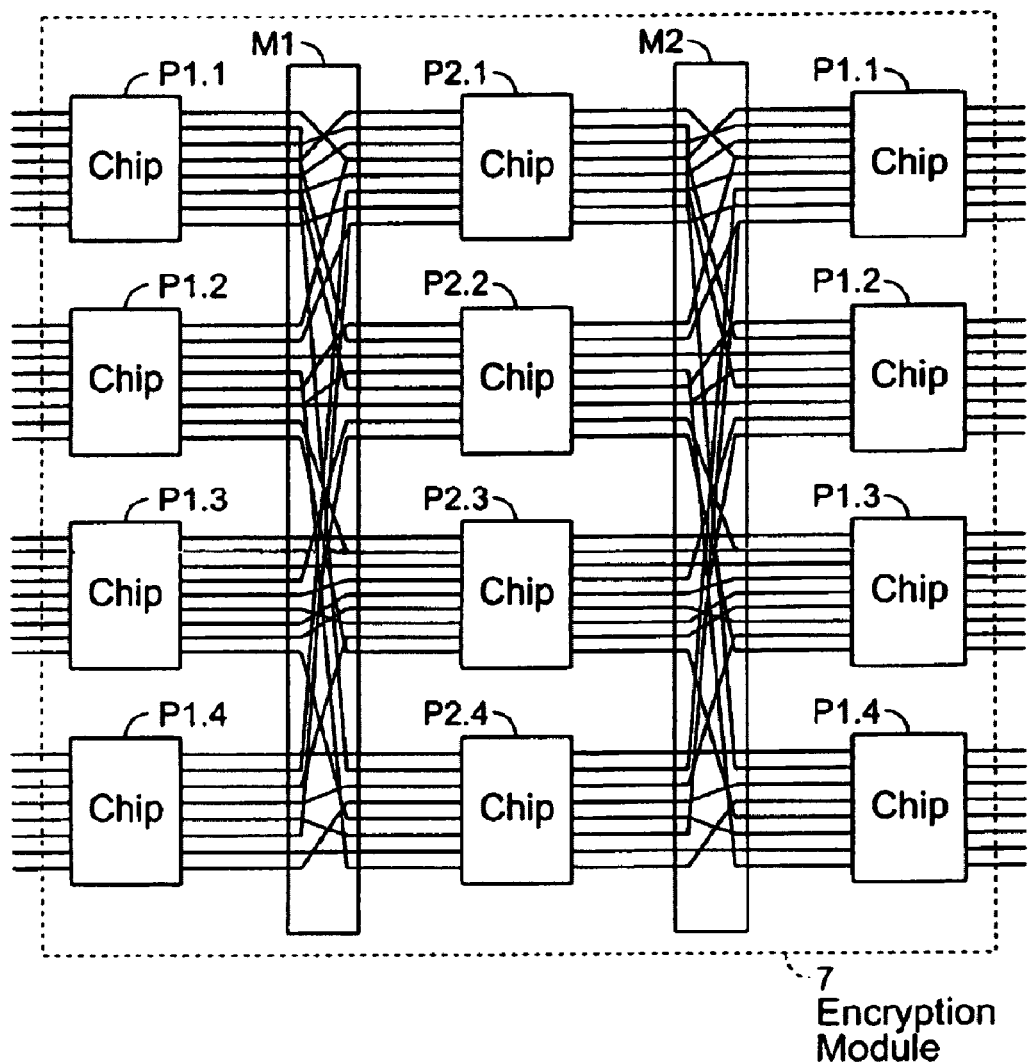
FIG. 6 shows an embodiment of the encryption module 7.

FIG. 6 illustrates in more details an embodiment of the encryption module 7, part of the device according to the invention. Now, 12 DES chips arranged in columns of four are inserted; these chips are referenced by notation $P_{i,j}$ where i is the index of the column and j that of the line. Two mixers M1 and M2 are also added.

This encryption module operates with any block encoding algorithm, whereby the latter may be performed by a software package or by a specific hardware device. In order to simplify the test and to emphasize the analogy with algorithms of the DES triple type detailed later on, an example based on the use of a DES chip will be discussed.

The DES algorithm operates with a 56 bit key on messages cut up into 64 bit packets. Triple DES is an encoding algorithm based on the use of three successive DES algorithms and which may be implemented by using three DES chips. A packet to be encrypted crosses the first chip and is encrypted with a first encryption key, it then crosses the second DES chip and is encrypted with a second key, but by using here the DES inverse algorithm. It then crosses the third DES chip where it is again encrypted with the first key.

Mixers are available commercially which allow a message to be mixed: 'n' input bits are mixed by the mixer which provides 'n' output bits but in a different order. This order may be redefined by a number, every time. This mixing function may be reduced to a table look-up and it may be performed by software on the microprocessor 1 contained in the invention or by a programmable component.

By coupling several DES chips with such a component, a DES may be designed which works on much larger packets. For example, let 12 DES chips be placed in rows by 4. The first 4 are placed in parallel and process a message of 4 times 64 bits (the chips simultaneously operate with encryption keys K1,1, K1,2, K1,3, K1,4, for chips P1,1, P1,2, P1,3 and P1,4, respectively). Subsequently, the message crosses a mixer M1 (controlled by key X). The message then crosses a new row of 4 DES chips P2,1, P2,2 P2,3, P2,4 in parallel (controlled by keys K2,1, K2,2, K2,3, K2,4) In this second row of chips, the used algorithm is the inverse of the one used in the first and second rows (as in triple DES). Then the message crosses through another mixer (controlled by key $X^{-1}$ in order to perform inverse mixing). Finally, a last row of 4 DES chips, P3,1, P3,2, P3,3, P3,4 (controlled by keys K3,1, K3,2, K3,3, K3,4) processes the message.

This set-up may be completed in three phases with a single DES chip and a single mixer, provided that the intermediate results are stored. For this, in a first phase, the 4 times 64 bit message to be processed is cut up into four 64 bit packets. The first packet crosses the chip controlled by key K1,1 and the result is stored. Then the second packet crosses the chip this time controlled by key K1,2, the result is stored. In the same way, the third packet is encrypted by key K1,3, then stored. Finally, the fourth packet is encrypted by key K1,4 and stored.

Each of these four packets encrypted with the help Ia of (64 bit) keys K1,1, K2,2, K1,3 and K1,4 enters the mixer and is then stored, and cut up into four new small 16 bit packets. The first 16 bit sub-packets issued from the encrypted and mixed 64 bit packets are combined, forming a new 64 bit packet which in turn is mixed.

This is repeated a third time as described in the above paragraphs after replacing encryption keys K2,1, K2,2, K2,3, and K2,4 with keys K3,1, K3,2, K3,3 and K3,4. Of course, in this third pass, information does not necessarily pass through a mixer. A very high security version may be designed with 12 different keys for the DES and with two other keys for the mixers. The entire key may have for example 1024 bits in order to maintain a power of 2 (56 times 12, i.e. 672 bits for the DES, the keys for the mixers may be much longer).

The symmetry of triple DES may be maintained by using identical keys in the first and third phases, i.e. K3,1 K1,1, K3,2=K1,2, K3,3=K1,3 and K3,4=K1,4 (the entire key will then have a size of 512 bits) or by producing a simpler version for the general public, or K1,1=K1,2=K1,3=K1,4 and K2,1=K2,2=K2,3=K2,4. The key will then have 128 or 256 bits.

On a same basis, it is possible to work on large blocks grouping an arbitrary number of elementary blocks on which will act a DES or any other block encoding algorithm.

In a third preferred embodiment where each device according to the invention may be placed either in a computer or in an independent module, the device is then miniaturized in a chip.

Figure 7:
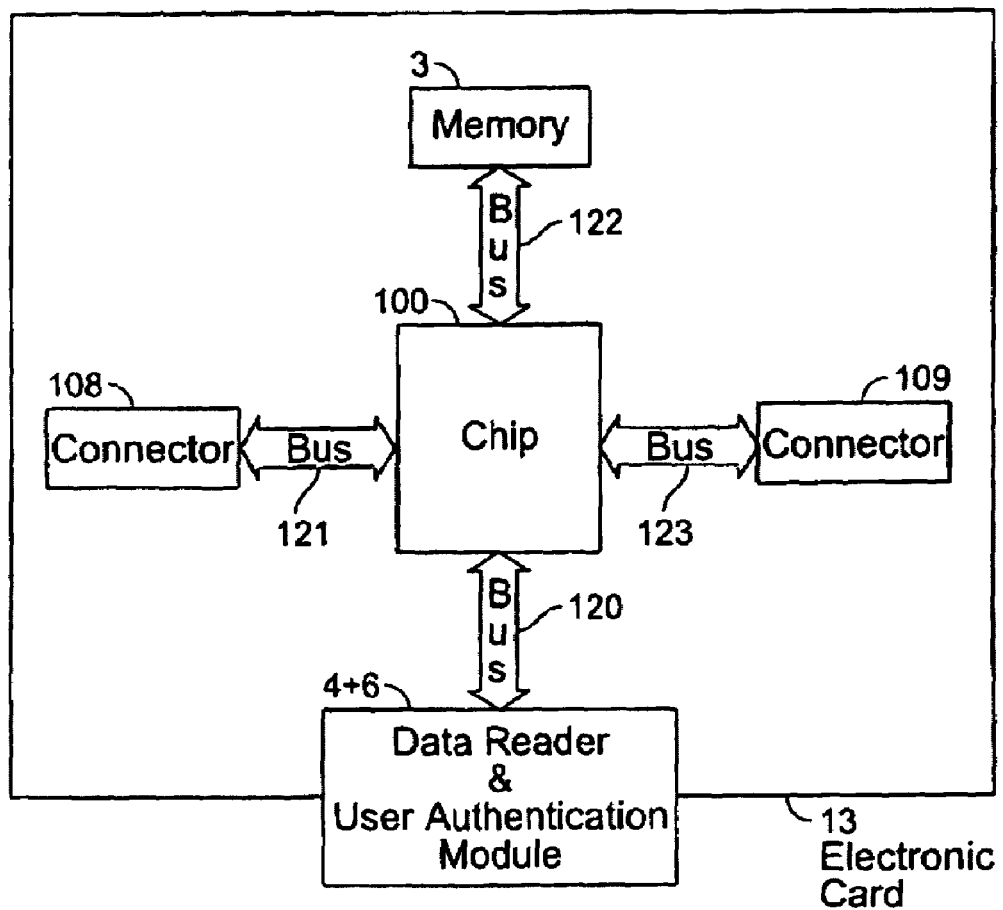
FIGS. 7 and 8 show an embodiment of the device according to the invention when it is miniaturized in a chip.
Figure 8:
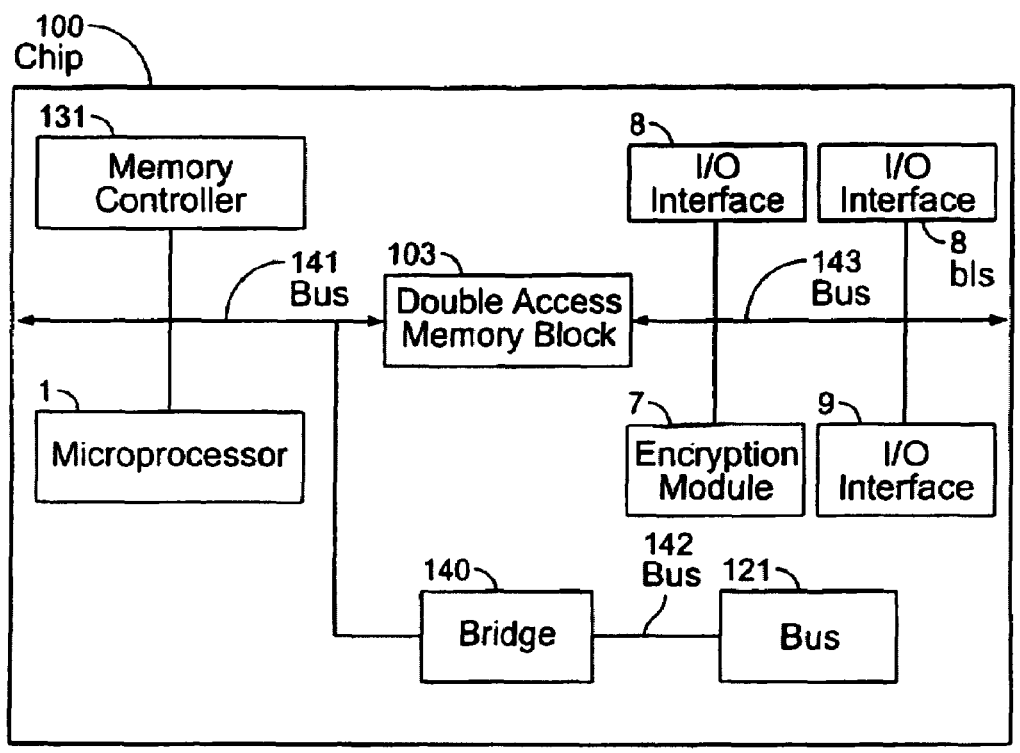

The third preferred embodiment is described in FIGS. 7 and 8.

The device according to the invention is then made up of an electronic card 13 bearing a chip 100 connected through several buses 120, 121, 122, and 123 with:
- a memory 3,
- two physical connectors 108 and 109, which in this preferred embodiment, are two network connectors (for example ARJ45) or a network connector and a connector to an internal bus of the computer (for example, a PCI bus),
- a data reader 4 may further be coupled with an authentication module 7 as a chip card reader which may be placed on the electronic card or which may be external to the above described module according to another embodiment.

The components (3, 4 and 6) used in this preferred embodiment may be those used in the first embodiment.

Bus 120 is a serial bus (RS 232), busses 121, 122 and 123 are 32 bit buses.

Connectors 108 and 109 are standard connectors which are found for example on PCI/Ethernet network cards.

Chip 100 is described in FIG. 7. This type of chip is usually called a 'system on a chip' by computer specialists.

The chip is then made up of a processor core 1 (for example a ARM 7 from the ARM company) connected through a 32 bit bus 141 to:
- a memory controller 131 which controls external memory 3
- a bridge 140, enabling several buses to be connected with one another
- a double access memory block 103 internal to the chip.

Bus 143 is connected to memory 103. Both buses may thus read and write into memory 103. Bus 143 is connected with 3 input/output interfaces 8, 8bis and 9. Interfaces 8 and 8bis are network interfaces (for example Ethernet) supporting all the link and physical layers of the ISO standard (encapsulation, transport . . . ). Upon implementing chip 100 on card 13, the input/output interfaces to be used are selected (for example network/network, for an external embodiment or network/bus for an embodiment internal to the computer).

Thus, this embodiment allows a unique chip 100 to be produced with which an internal or external device may subsequently be built very simply.

Bus 142 is connected to a serial interface (RS232) enabling the chip card reader 4 to be controlled. It is possible to add other RS232 interfaces on this bus, for example, for connecting chip 100 to a V-modem or simply for controlling the diodes placed on card 13.

The operation of the module is identical to the operation of the invention as described in the first or second preferred embodiment: everything depends on the private encryption key which may be placed either in chip 100 (as in the first embodiment) or provided by the user (as in the second embodiment).

It is well understood that the different embodiments described above are purely illustrative and non-limiting and that many alterations may be made to them without however departing from the scope of the invention.

It should be noted that the chip card reader may be replaced with a finger print reader or with a reader for the retina of the user.

What is claimed is:

1. A method for distributively and dynamically securing a communications network, comprising the steps of:
   interconnecting a network device between each computer equipment to be secured and the network;
   intercepting communications between a computer equipment connected to said device and the network by said device;
   obtaining information related to a user of said computer equipment by an authentication module associated with said device;
   defining a security level of said device by said authentication module associated with said device;
   transmitting said information related to the user and said security level of said device to an authentication management server connected to the network;
   authenticating the user by said authentication management server in accordance with said information related to the user and said security level of said device;
   distributively transmitting security parameters from said authentication management server to devices on the network;
   storing said security parameters by each device; and
   processing, in each device, said security parameters received from said authentication management server, thereby distributively and dynamically configuring the security of the network to address new modes of attack.

2. The method of claim 1, wherein said security parameters comprise a list of authorized computer client/server applications and information enabling each device to analyze messages related to said client/server applications.

3. The method of claim 2, further comprising the steps of:
   analyzing the messages related to said client/server applications by said device;
   filtering the messages related to said client/server applications by said device; and
   altering the messages related to said client/server applications by said device, thereby establishing a firewall.

4. The method of claim 1, wherein said security parameters comprise a list of computer equipment which the user is authorized to communicate with.

5. The method of claim 4, further comprising the steps of:
   enabling said device to transmit messages between said computer equipment associated with the user and a computer equipment on said list; and
   blocking said device from transmitting messages between said computer associated with the user and a computer equipment not on said list.

6. The method of claim 1, further comprising the steps of:
   customizing said device in accordance with a private encipherment key provided by said authentication module;
   storing public encipherment keys associated with private encipherment keys which customize the devices by said server.

7. The method of claim 6, wherein said security parameters comprise a list of computer equipment and the corresponding public encipherment key which the user is authorized to communicate with, in an enciphered manner.

8. The method of claim 7, further comprising the step of enciphering by said device communications between said computer equipment associated with the user and a computer equipment on said list by combining the private encipherment key of said device with the public encipherment key of said computer equipment on said list.

9. A system for distributively and dynamically securing a communications network secure, comprising:
   a network device interconnected between each computer equipment to be secured and the network, said device comprising:
      at least two input/output interfaces for intercepting communications between a computer equipment connected to said device and the network;
      an authentication module for obtaining information related to a user of said computer equipment and for defining a security level of said device;
      a transmitter for transmitting said information related to the user and said security level of said device to an authentication management server connected to the network;
      a storage device; and
      a processor; and
   wherein said authentication management server connected to the network comprising:
      a processor for authenticating the user in accordance with said information related to the user and said security level;
      a management device for managing the authentications and the security levels of said devices in said authentication management server; and
      a transmitter for distributively transmitting security parameters to each devices on the network; and
   wherein said storage device is operable to store said security parameters and said processor of said device is operable to process said security parameters to establish a firewall, thereby distributively and dynamically configuring the security of the network to address new modes of attack.

10. The system of claim 9, wherein said security parameters comprise a list of authorized computer client/server applications and information enabling each device to analyze messages related to said client/server applications.

11. The system of claim 10, wherein said processor said device comprises:
   an analyzer for analyzing the messages related to said client/server applications;
   a filter for filtering the messages related to said client/server applications; and
   an altering device for altering messages related to said client/server applications.

12. The system of claim 9, wherein said security parameters comprise a list of computer equipment which the user is authorized to communicate with.

13. The system of claim 12, wherein said processor of said device comprises a controlling device for controlling said device to transmit messages between said computer equipment associated with the user and a computer equipment on said list and to block messages between said computer equipment associated with the user and a computer equipment not on said list.

14. The system of claim 9, wherein said authentication module of said device is operable to customize said device in accordance with a private encipherment key;
   and wherein said server is operable to store all public encipherment keys associated with private encipherment keys which customize the devices.

15. The system of claim 14, wherein said security parameters comprise a list of computer equipment and the corresponding public encipherment key which the user is authorized to communicate with, in an enciphered manner.

16. The system of claim 15, wherein said device further comprises an encipherment module for enciphering communications between said computer equipment associated with the user and a computer equipment on said list by combining the private encipherment key of said device with the public encipherment key of said computer equipment on said list.

17. A server for distributively and dynamically securing a communications network, comprising:
   a processor for processing information and security levels received from a plurality of network devices to authenticate users, each information and security levels being related to a user of a computer equipment connected to a device;
   a management device for managing the authentication and security levels of the users; and
   a transmitter for transmitting security parameters to said devices, said security parameters establishing a firewall, said server thereby distributively and dynamically configuring the security of the network to address new modes of attack.

18. The server of claim 17, wherein said security parameters comprise a list of authorized computer client/server applications and information enabling each device to analyze messages related to said client/server applications.

19. The server of claim 17, wherein said security parameters comprise a list of computer equipment which a user is authorized to communicate with.

20. The server of claim 17, further comprising a storage device for storing all the public encipherment keys associated with private encipherment keys which customize said devices.

21. The server of claim 20, wherein said security parameters comprise a list of computer equipment and the corresponding public encipherment key which the user (U) is authorized to communicate with, in an enciphered manner.

22. A device for securing a communications network secure, said device being interconnected between each computer equipment to be secured and said network, comprising:
   at least two input/output interfaces for intercepting communications between a computer equipment connected to said device and the network;
   an authentication module for obtaining information related to a user of said computer equipment and for defining the security level of said device,
   a transmitter for transmitting information related to the user and said security level of said device to an authentication management server connected to the network;
   a storage device for storing security parameters received from said server; and
   a processor for processing said security parameters to establish a firewall, thereby distributively and dynamically configuring the security of the network to address new modes of attack.

23. The device of claim 22, wherein said security parameters comprise a list of authorized computer client/server applications and information enabling each device to analyze messages related to said client/server applications.

24. The device of claim 23, wherein said processor further comprising:

an analyzer for analyzing the messages related to said client/server applications;

a filter for filtering the messages related to said client/server applications; and an altering device for altering messages related to said client/server applications.

25. The device of claim 22, characterized in that the security parameters comprise a list of computer equipment which the user is authorized to communicate with.

26. The device of claim 25, wherein said processor is operable to permit messages to be transmitted between said computer equipment associated with the user and a computer equipment on said list, and operable to block messages between said computer equipment associated with the user and a computer equipment not on said list.

27. The device of claim 22, wherein said authentication module of said device is operable to provide a private encipherment key for customizing said device.

28. The device of claim 27, wherein said security parameters comprise a list of computer equipment and a corresponding public encipherment key which the user is authorized to communicate with, in an enciphered manner.

29. The device of claim 28, further comprising an encipherment module for enciphering communications between said computer equipment associated with the user and a computer equipment on said list by combining the private encipherment key of said device with the public encipherment key of said computer equipment on said list.

* * * * *